United States Patent [19]

Teague, Jr. et al.

[11] 4,281,681
[45] Aug. 4, 1981

[54] DIVERTER ATTACHMENT FOR WATER-POWERED APPLIANCE

[76] Inventors: Walter D. Teague, Jr., Tweed Blvd., Nyack, N.Y. 10960; Arthur T. Sempliner, 37-04 Van Nostrand Pl., Douglaston, N.Y. 11363

[21] Appl. No.: 88,771

[22] Filed: Oct. 29, 1979

[51] Int. Cl.³ .................. F16L 37/28; F16K 47/08
[52] U.S. Cl. .................. 137/562; 137/505.25; 137/799; 137/879; 137/881; 137/882
[58] Field of Search ............. 137/505.25, 562, 799, 137/879, 881, 882; 251/149.6; 285/8, 190

[56] References Cited

U.S. PATENT DOCUMENTS

| | | |
|---|---|---|
| 3,006,366 | 10/1961 | Jagusch . |
| 3,036,595 | 5/1962 | Rogers . |
| 3,306,319 | 2/1967 | Kendt et al. . |
| 3,593,743 | 7/1971 | Guth . |
| 3,635,243 | 1/1972 | Brezosky . |
| 3,692,053 | 9/1972 | Kaldenberg . |
| 3,717,173 | 2/1973 | Nyberg . |
| 3,941,153 | 3/1976 | Traube et al. . |

*Primary Examiner*—Gerald A. Michalsky
*Attorney, Agent, or Firm*—Mandeville and Schweitzer

[57] ABSTRACT

The disclosure is directed to a diverter coupling, for use in connection with a water-powered appliance, for coupling the appliance to a water outlet, typically a standard household faucet. The diverter coupling is constructed predominantly of molded plastic parts, to accommodate low cost manufacture, and includes detachable sections mounted respectively on the faucet outlet and on the end of the inlet tubing to the appliance. When the two parts are coupled together, water flow from the faucet is diverted into the appliance inlet, flows through the appliance, and is returned and discharged at the sink. Pressure regulating means prevents overloading of the appliance by excessive water pressure.

10 Claims, 8 Drawing Figures

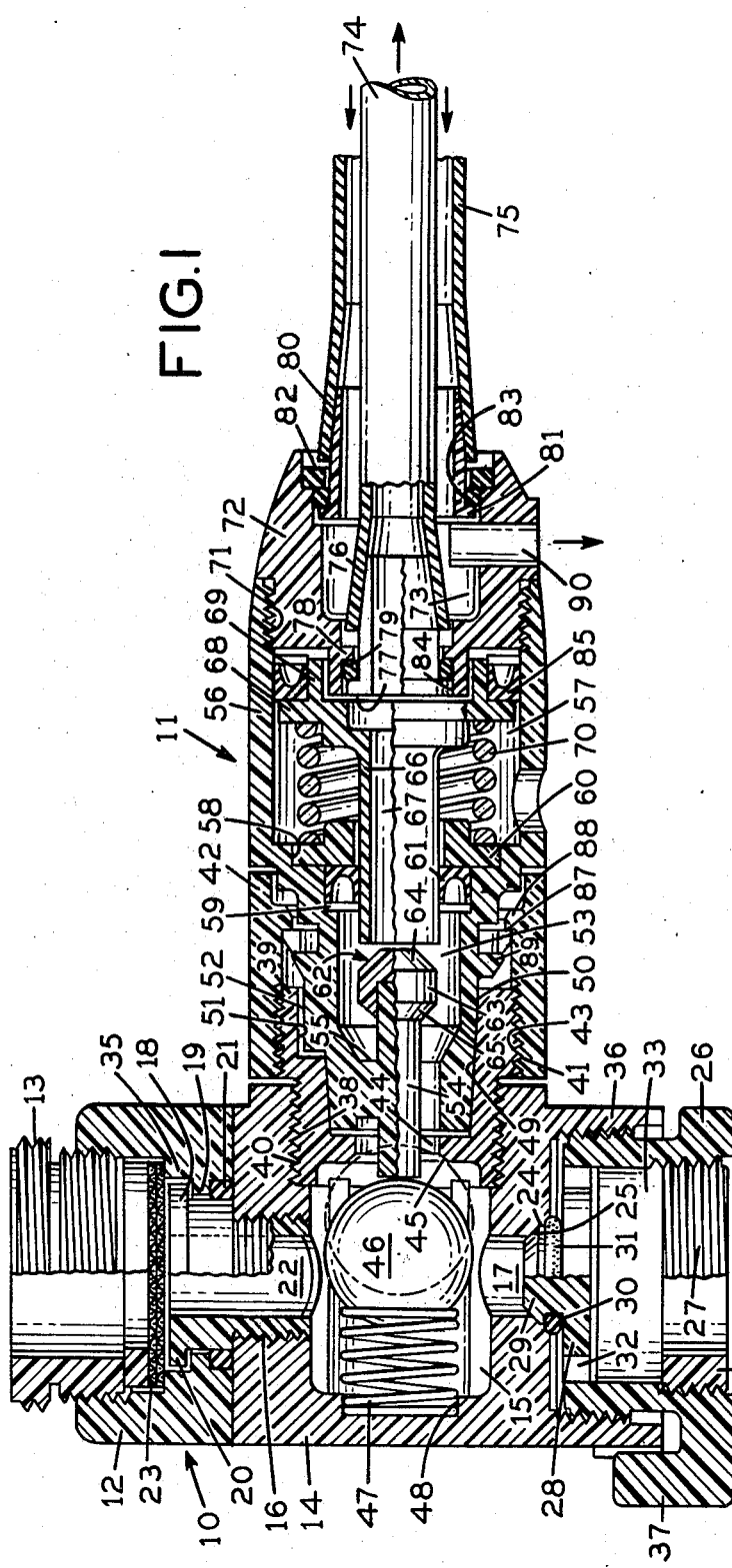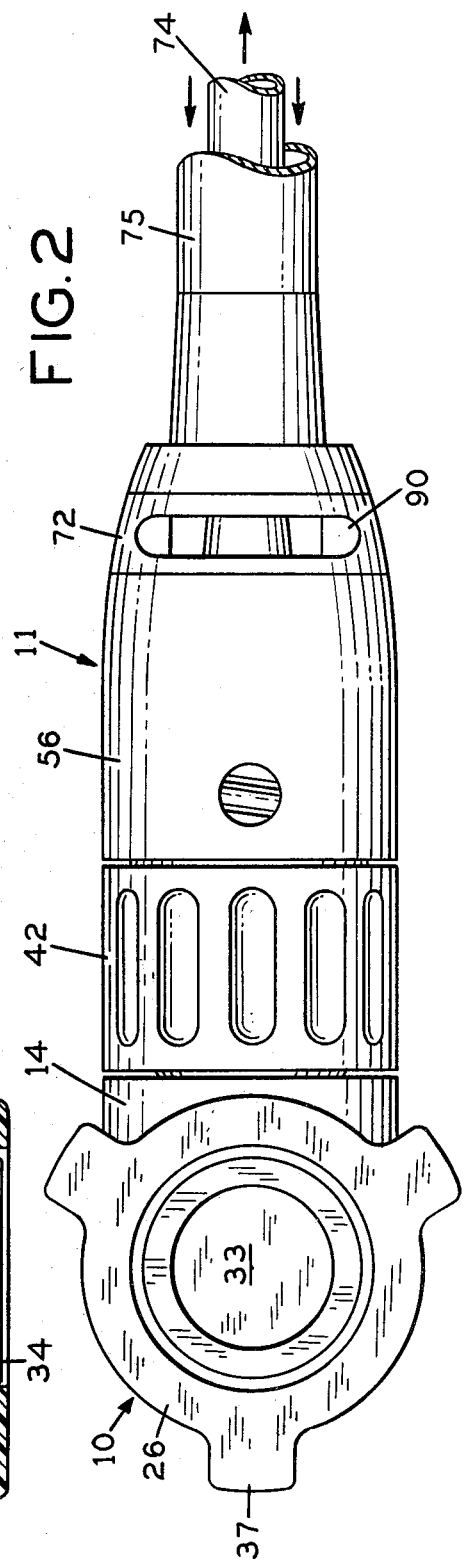

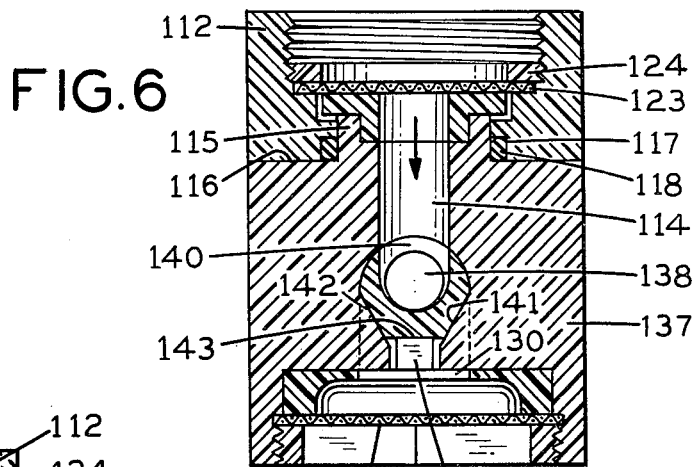
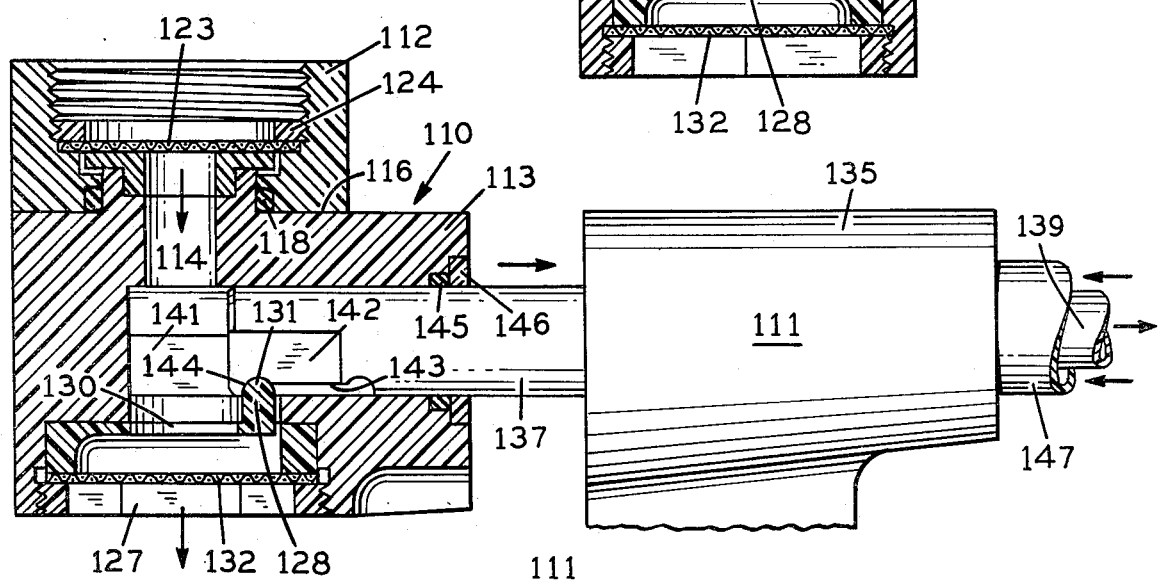
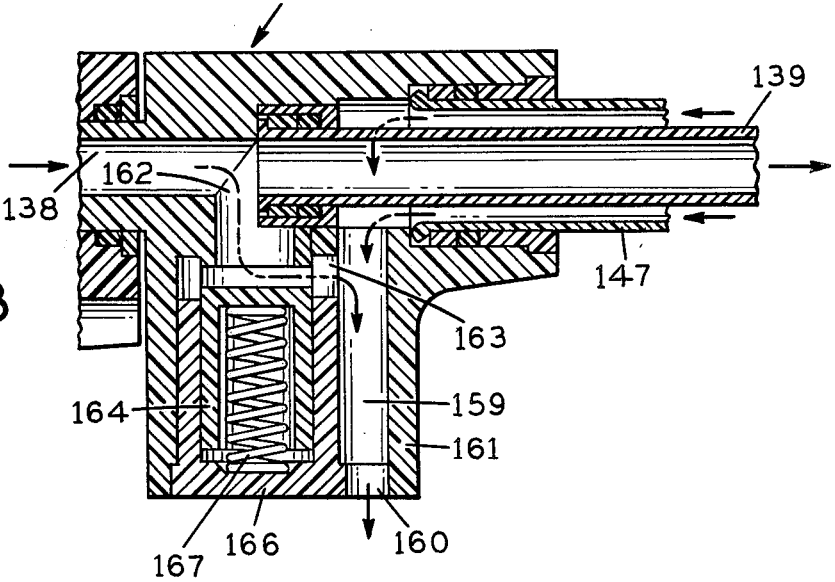

DIVERTER ATTACHMENT FOR WATER-POWERED APPLIANCE

RELATED CASES

The present application is related to the subject matter of our co-pending U.S. Application Ser. No. 848,807, filed Nov. 7, 1977, for "Power Toothbrush Or The Like With Orbital Brush Action", now U.S. Pat. No. 4,175,299, and the subject matter of said application is incorporated herein by reference. The subject matter of the present invention, however, is not necessarily limited to the utilization with the appliance of our earlier application.

BACKGROUND AND SUMMARY OF THE INVENTION

In our above-mentioned co-pending application, there is disclosed a water-powered appliance, in the form of a power toothbrush for household use. In connection with that and other water-powered appliances, it is appropriate to have a convenient facility for connecting the appliance to the household water supply. Typically, as in the case of such well known appliances as portable dishwashers, for example, a two-part coupling attachment is provided, including a fixed part which may be attached semi-permanently to the household faucet outlet, and a removable part, attached to the appliance, which can be quickly coupled to and detached from the fixed part. The present invention is directed to a coupling attachment of this general class, which is designed and constructed in a novel and advantageous manner, for optimum utilization in connection with a small, lightweight appliance such as a power toothbrush, for example.

In accordance with one aspect of the invention, the coupling attachment is designed and contructed so as to be capable of manufacture almost exclusively out of molded plastic parts. This enables the device to be mass-produced on a low cost basis. In addition, the plastic construction provides for a desirably lightweight unit, and one which is hygienically suitable for use in connection with an appliance such as a toothbrush.

Pursuant to another aspect of the invention, a coupling attachment is provided in which the assembled parts of the coupling have operating and non-operating positions while in a coupled relation. By this means, the coupling may alternatively be set to permit direct flow of water through the faucet into the sink or to effect diversion of the water into the coupled appliance. This enables the appliance to remain coupled to the faucet, if desired, even when the appliance is idle and the faucet is used for conventional purposes.

In accordance with another feature of the invention, the diverter coupling incorporates a tubular valve element into the internal water flow passage-forming means of the diverter. The tubular valve element is movable by increased water pressure toward a valve seat to restrict or throttle the flow of water toward the appliance connected to the diverter coupling, thereby protecting the appliance from possible damage due to overloading by excessive water pressure.

Pursuant to another embodiment of the invention, the pressure relief means comprises a simplified form of pressure relief valve on the inlet side, such that, if the inlet pressure exceeds a predetermined maximum at which the appliance is intended to be operated, a portion of the water is by-passed directly into the sink, in order to maintain operating pressure at a desired level.

For a more complete understanding of the above and other features and advantages of the invention, reference should be made to the following detailed description of preferred embodiments and to the accompanying drawings.

DESCRIPTION OF THE DRAWINGS

FIG. 1 is a longitudinal, cross sectional view of the coupling attachment of the invention shown with the parts in coupled and operating relation.

FIG. 2 is a bottom plan view of a coupling attachment of FIG. 1.

FIG. 6 is a cross sectional view as taken generally on line 6—6 of FIG. 3.

FIG. 7 is a view of the diverter of FIG. 3, partly in cross section and partly in elevation, illustrating the coupling attachment in coupled but non-operating mode, with the removable part partially retracted.

FIG. 8 is a cross sectional view of the device of FIG. 3, showing a pressure relief by-pass valve operating to relieve excess pressure.

DETAILED DESCRIPTION OF PREFERRED EMBODIMENTS

Figure 3:
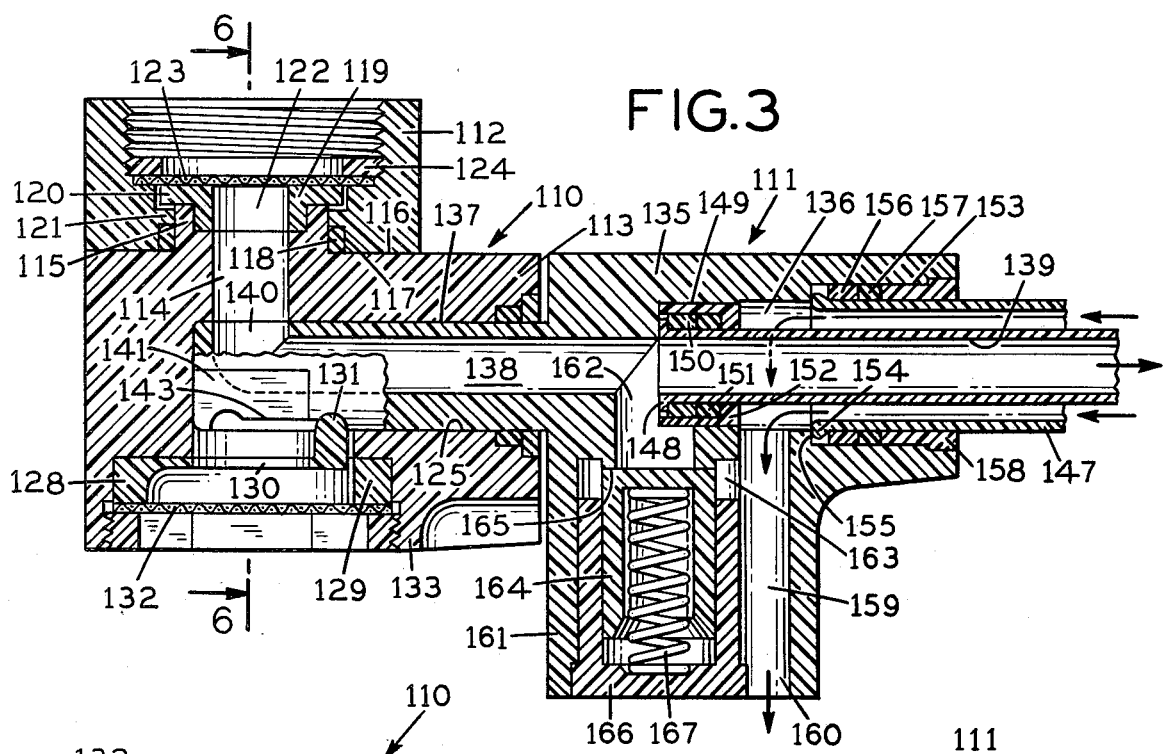
FIG. 3 is a longitudinal cross sectional view of another embodiment of the coupling attachment of the invention, shown with the parts in coupled and operating relation.

Referring now to the drawings, the reference numerals 10,11 designate generally fixed and removable parts respectively of the new diverter attachment for a water-powered appliance. The fixed part 10 includes an internally threaded collar 12 which is adapted to be threadedly received on the end of a conventional household faucet, for example, by the use of threaded adapter 13. The collar 12 is preferably formed of molded plastic and is movably joined with a molded body section 14 of like material. The molded body section 14 includes an internal cavity 15 and vertically-extending inlet and outlet passages 16,17 communicating with the cavity 15 and opening, respectively, to the top and bottom surfaces of the body section 14. The inlet passage 16 is provided with an internal threaded surface to threadedly receive a flanged retainer 18. The collar 12 includes an inwardly-extending flange 19 which underlies an outwardly-extending flange 20 of the flanged retainer 18. In this manner, the collar 12 and flanged retainer 18 are mechanically locked together while accommodating swiveling movement of the body section 14.

An O-ring 21 is mounted beneath the inwardly-extending flange 19 and rests on the top surface of the body section 14 to assure a water-tight seal between the collar 12 and body section 14. The flanged retainer 18 includes an opening 22 extending through the retainer 18 and providing a passage for flow communication between the faucet adapter 13 and the cavity 15 of the body section 14. To advantage, a screen 23 is placed between the adapter 13 and the top of the opening 22 to prevent foreign articles from passing into the diverter assembly. The screen 23 rests on an internal shoulder 35 formed within the collar 12 and is held in place by the adapter 13 which is screwed tightly into the collar 12.

In accordance with one aspect of the invention, the body section 14 includes an integral, internally-threaded collar portion 36 extending from the lower end thereof in a co-axial relation to the outlet passage 17. The outlet passage 17 is of a generally cylindrical configuration with an outwardly flaring end section 24. A valve seat 25 is defined by the junction of the generally cylindrical portion of the outlet passage 17 and the outwardly flaring portion 24 thereof. A hollow screw element 26 is threadedly received within the integral collar portion 23 of the body section 14 and includes an open, threaded section 27 and a closed end 28. A generally conical valve element 29 extends from the closed end 29 of the screw element 26 and is axially aligned with the outlet passage 17 so that when the screw element 26 is tightened within the collar portion 36, the valve element 29 extends into the outwardly flaring portion 24 of the outlet passage 17 and mates with the valve surface 25 to close off the outlet passage 17 to fluid flow. The valve element 29 is recessed at 30 to accommodate an O-ring 31 thereby facilitating a leak-tight seal when the valve element is in a closed position. A plurality of port-like openings 32 are formed through the closed end 28 of the screw element 26, such that water may flow through the ports 32 into the hollow interior of the screw element 26 when the valve 29 is in an opened position.

Desirably, ear projections 37 are integrally formed along the outer perimeter of the screw element 26 to simplify the turning of the element 26 when it is desired to open or close the valve. The thread of the threaded section 27 is formed to a steep helix angle so that the valve element 29 may be shifted from a fully open to a fully closed position by a limited angular turn of the screw element 26. To advantage, the threaded section 27 may be formed to a ratchet tooth configuration to prevent the element 26 from coming off the portion 36. When the valve element 26 is in an open position, water is free to flow from the faucet through the adapter 13, body section 14 and out the open end of the screw element 26. By closing the valve element 26, the water flow is divertable to a water-powered household appliance, as will be fully discussed below.

To advantage, an aerator 33 may be placed within the hollow interior of the screw element 26 directly beneath the ports 32. To this end, a threaded collar 34 is received in the threaded section 27 of the screw element 26 to hold the aerator 33 in place.

Referring now to the right-hand side of the body section 14, a threaded, horizontal opening 38 is formed to extend from the cavity 15 to the outer surface of the body section 14. A molded, hollow connector section 39 includes a two-stepped, outer threaded surface. The first step portion 40 of the connector section 39 is threadedly received within the threaded horizontal opening 38 to securely fasten the connector section 39 to the body section 14. The second step portion 41 is of a wider diameter than the first step portion 40 and extends laterally from the body section 14 to provide a threaded connector element for the body section 14.

The removable part 11 is provided with a knurl nut 42 which is rotatably, mechanically interlocked with the removable part 11 by an expansion ring 87 interposed between flange portions 88,89 formed in the knurl nut 42 and removable part 11, respectively. The knurl nut 42 includes a threaded portion 43 extending over an area of the internal surface thereof for threaded engagement with the second step portion 41 of the connector section 39. The removable part 11 is easily attached to and unattached from the fixed part 10 simply by rotating the knurl nut 42 about the second step portion 41 in either a clockwise or counter-clockwise direction.

In accordance with the invention, the interior of the hollow connector section 39 is provided with a continuous, generally circular, inwardly-extending projection which defines a circular opening 44 whereby fluid may flow from the internal cavity 15 of the body section 14 to the interior of the hollow connector section 39. The side of the opening facing the cavity 15 is formed to a tapered surface to provide a valve surface 45. A ball valve element 46 is disposed within the cavity 15 and is urged toward a sealing relation with the valve surface 45 by a coil spring 47 which acts between the ball valve 46 and a wall of the internal cavity 15. To advantage, a recessed section 48 may be formed within the internal cavity 15 to receive the end of the coil spring 47 acting against the cavity wall. The spring 47 will normally urge the ball 46 to close passageway 44 to fluid flow unless the removable part 11 is attached to the fixed part as will appear.

In accordance with a feature of the invention, the removable part 11 includes a jack plug extension 50 provided with a centrally-disposed internal passageway 53 which is axially aligned with the opening 44 when attached to the fixed part 10, whereby fluid passing from the internal cavity 15 of the body section 14 through the opening 44 will flow into the internal passageway 53 of the jack plug 50. The internal surfaces 49 of the connector section 39 are slightly tapered for a mating relation with the outer end of the jack plug extension 50 of the removable part 11 when the removable part 11 is attached to the fixed part 10. The fit between the tapered surface 49 and the exterior of the jack plug 50 is sufficiently snug to form a leak-tight seal therebetween, and, consequently, all the water flow through the opening 44 will continue into the internal passageway 53.

To assure proper orientation of the jack plug 50 with respect to the body section 14, the internal surface 49 of the connector element 39 is provided with a flat recess 51 which must be properly aligned and oriented with a flat 52 extending from the jack plug 50 upon insertion of the jack plug 50 into the interior of the connector element 39.

A rod-like plunger 54 extends co-axially with the internal passageway 53 and beyond the outer open end of the jack plug extension 50. The plunger 54 is securely mounted within the passageway 53 by a supporting post 55 integral with and extending from the internal surface of the passageway 53. As reflected in FIG. 1, when the jack plug 50 is fully inserted into the fixed part 10, the plunger 54 extends through the opening 44 and into the internal cavity 15. In this position, the plunger 54 will push the ball valve 46 against the spring 47 to keep the opening 44 clear, whereby fluid flow from the faucet may be diverted into the central passageway 53 and on to a fluid-operated household appliance, as will be described below.

When the removable part 11 is removed from the fixed part 10, the plunger 54 will be withdrawn out of the internal cavity 55 and the spring 47 will move the valve ball 46 into a mating relation with the valve surface 45, to close off fluid flow through the opening 44. Accordingly, the faucet may be used in a conventional manner assuming that the valve element 29 is in an opened position.

Integrally connected with the jack plug extention 50 is a cylindrical body portion 56 which is provided with a hollow interior 57. Circular recess portions 58,59 are formed at the end of the internal cavity 57 communicating with the internal passageway 53 of the jack plug extention 50. A collar 60 is tightly received in the circular recess 58 and a sealing element 61 is in a back-to-back relation with the collar 60 and tightly received in the circular recess 59. Each of the collar 60 and sealing element 61 includes a circular central aperture aligned with one another and forming a continuous opening extending between the passageway 53 and internal cavity 57.

In accordance with the invention, a first valve element 62, including a cylindrical central portion 63 and conically tapered, plug-like end portions 64, 65, is mounted on the end of the plunger 54 disposed within the central passageway 53. A second hollow tubular valve element 66 is slidably received through the central apertures of the collar 60 and sealing element 61 whereby the open left hand end of the tube is aligned with and slightly spaced from the tapered, plug-like end surface 64 of the valve element 62. The sealing element 61 forms a leak-tight seal around the outer surface of the tubular valve element 66, requiring all water flowing through the internal passageway 53 to enter the flow path 67 defined by the tubular valve element 66.

The right hand end of the tubular valve element 66 is formed to include an integral, outwardly-extending flange portion 68 provided with a cylindrical extension 69 which is in a concentric relation to the fluid flow path 67. A coil spring 70 acts between the collar 60 and the flange portion 68 and normally maintains the tubular valve element 66 in axially spaced relation to the valve element 62.

In the outer end of the body portion 56, an internal threaded portion 71 is provided for securely mounting an end cap member 72 thereto. The end cap member 72 is provided with an internal fluid path 73 which includes a plurality of concentric steps and flanges formed in the inner surface thereof for the reception and swivel connection of a double concentric tubing arrangement connecting the diverter assembly to a fluid driven household appliance. The double concentric tubing arrangement comprises an inside tubing member 74 and an outside tubing member 75. The end of the inside tubing member 74 is received over and bonded to the tapered end of a plastic connector element 76. The opposite end of the plastic connector element 76 includes an outwardly extending flange 77 which cooperates with an inwardly extending flange 78 formed on the inner surface of the flow path 73 such that the connector element 76 is mechanically locked within the passageway 73 of the end member 72, while accommodating swiveling movement of the connector element 76 and the attached inside tubing member 74. An O-ring 79 is in a leak-tight fit between the flanges 77,78.

In a like arrangement, the outside tubing member 75 is received over and bonded to the tapered outer end of a plastic connector element 80 which also includes an outwardly extending flange 81. The flange 81 is retained by a washer 82 which is tightly held in the step 83 formed within the passageway 73 of the end member 72 to provide a swiveling mechanical interlock between the outside tubing member 75 and end member 72. An O-ring 83 is placed between the flange 81 and washer 82 to insure a leak-tight seal.

With the above-described arrangement, the open end of the plastic connector element 76 is in a face-to-face, spaced relation to the right hand open end of the flow passage 67. The end cap member 72 includes a cylindrical extension 84 which is loosely received within the cylindrical extension 69 of the tubular valve element 66. A sealing element 85 closely surrounds the extension 69 and forms a leak-tight seal between the outside of the tubular valve element 66 and the inner surface of the cavity 57. Consequently, water flow diverted into the passageway 53 will enter flow path 67, as described above, egress therefrom and flow via the connector element 76 into the inner tubing member 74 to the fluid input of a household appliance.

At the same time, a portion of the water under pressure will flow between the cylindrical extension 69 of the tubular valve element 66 and end member 72 to exert fluid pressure on the surfaces of the sealing element 55 and the portion of the valve element 66 spaced from the end member 72. If the water pressure from the faucet should be above the level which may cause damage to the concentric tubing and/or the household appliance (e.g. 40 psig), the fluid force will be sufficient to displace the tubular valve element 66 to the left, against the force of the coil spring 70. This action will move the open end of the flow path 67 toward the conical surface 64 of the valve element 62 which will cause a throttling or restriction of the fluid flowing into the flow path 67 and eventually to the inner tubing member 74 and household appliance. Accordingly, the appliance will be protected from high fluid pressure.

In the operation of the diverter of the present invention, the removable part 11, which is connected to a household appliance by the concentric tubing 74,75, may be easily attached to the fixed part 10 thereof by inserting the jack plug extention 50 into the connector section 39 of the fixed part 10 and rotating the knurl nut 42 to secure the removable part 11 to the fixed part 10. In this manner, the valve ball 46 will be displaced from the valve surface 45 by the plunger 54 thereby allowing water from the faucet to be diverted to the input of the household appliance. Of course, the screw element 26 should be rotated to place the valve element 29 in a closed position.

When it is desired to use the faucet in a conventional manner, the screw element 26 is rotated to place the valve element 29 in the open position, whereby, by reason of the Bernoulli effect, water from the faucet will flow directly through the fixed part 14. To remove the appliance, the knurl nut is rotated to remove the removable part 11.

To advantage, the outer tubing member 75 is connected to the fluid return of the household appliance. The passageway 73 of the end cap member 72 is provided with an outlet opening 90 to a sink or other appropriate receptacle arranged below the faucet (not shown).

Figure 4:
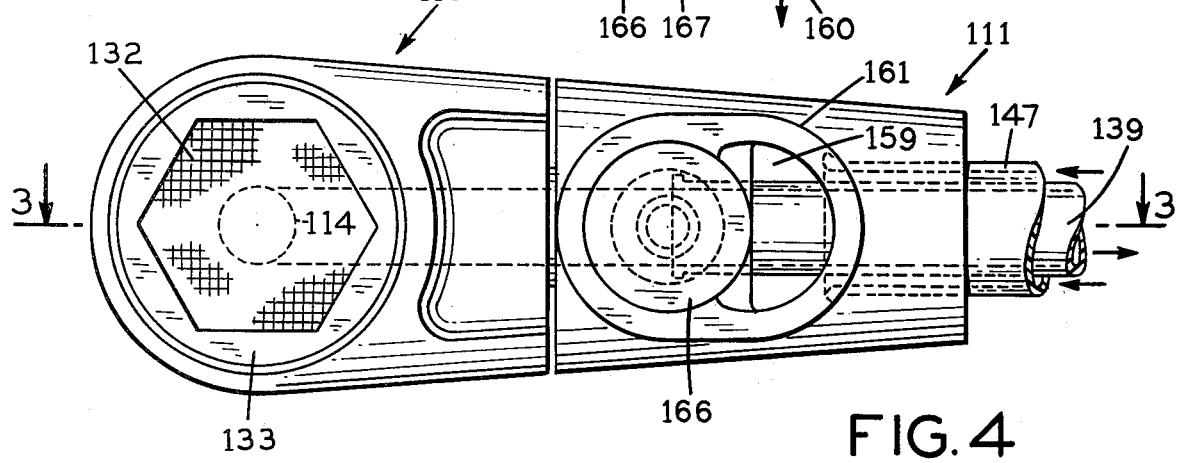
FIG. 4 is a bottom plan view of the coupling attachment of FIG. 3.
Figure 5:
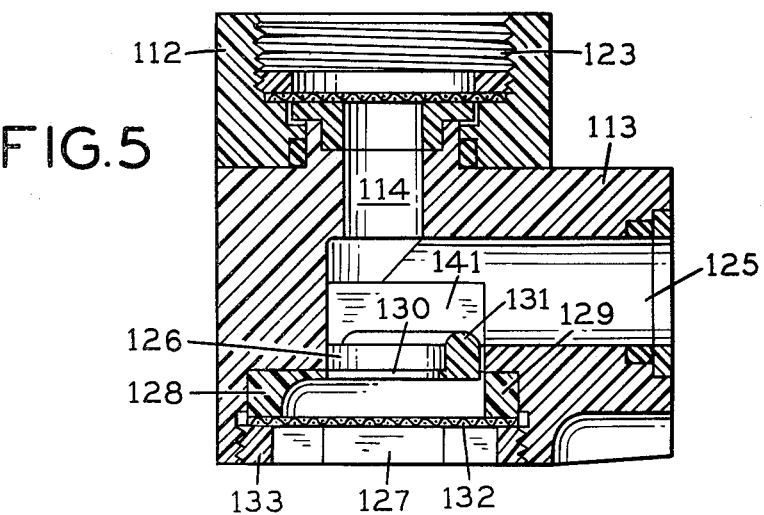
FIG. 5 is a longitudinal cross sectional view of the fixed part of the coupling attachment of FIG. 3, intended for mounting on a household faucet.

Referring now to FIGS. 3-8, there is shown another embodiment of the present invention. The reference numerals 110,111 designate generally fixed and removable parts respectively of the new diverter attachment. The fixed part, which is shown by itself in FIG. 5, includes an internally threaded collar 112, which is adapted to be threadedly received on the end of a conventional household faucet, for example, using an adaptor (not shown) if necessary. The collar 112 is formed of molded plastic and is movably joined with a molded body section 113 formed of like material. The body portion 113 has an inlet passage 114 extending vertically and surrounded at its upper end by a circular boss 115. The collar 112 is received snugly over the boss 115 and is seated against the upper surface 116 of the body member 113. The collar is recessed at 117 to accommodate an O-ring 118, in order to assure a watertight seal. As reflected in FIGS. 3 and 5, the collar 112 is secured to the body member 113 by means of a flanged washer 119, which is received within and adhesively bonded to the boss 115 of the body member. Outwardly extending flanges 120 of the washer overlie inwardly extending flanges 121 of the collar 112, such that the collar and body member are mechanically locked together while accommodating swiveling movement of the body member.

The flanged washer 119 is provided with an opening 122 communicating with the inlet passage 114, and a filter screen 123 overlies the opening 122 to prevent foreign particles from passing into the diverter assembly. The screen 123 advantageously is held in position by means of a threaded washer 124, which is received internally of the collar 112.

The body member 113 is provided internally with a horizontal, cylindrical recess 125 opening at the front of the body portion and communicating internally with the inlet passage 114. Additionally, the body portion is formed with a downwardly opening recess 126, located directly below the inlet passage 114. Desirably, the arrangement of the downwardly opening recess 126 and the inlet passage 114 is such that water entering the inlet passage 114 from a faucet may flow directly downward and discharge through the outlet 27. In normal operation, there will be no diverted flow of water through the horizontal recess 125, even though that recess is exposed to the downward flow of water.

For purposes to be described, there is received and adhesively bonded in the lower portion of the body member 113 a detent ring 128. The detent ring includes an outer ring-like portion 129 which is secured to the body member. Extending from one side of the ring-like portion 129 is a resilient tongue 130 mounting a detent lug 131 at its free end. The main portion of the resilient tongue 130 is provided with a central opening aligned with and preferably somewhat larger than the inlet passage 114 to accommodate the free flow of water therethrough toward the discharge outlet of the body member.

A filter screen 132 may also be provided in association with the discharge outlet 127. In the illustrated arrangement, the filter screen 132 is held against the bottom of the detent ring 128, by means of a threaded collar 133.

The removable part 111 of the diverter assembly includes a body portion 135 having at one end a recess 136 for the reception of flexible flow tubing, to be described, and at the other end a generally cylindrical jack plug 137. The jack plug 137 is slidably insertable into the cylindrical recess 125 of the body member 110, to provide mechanical support for the removable part 111 and also to provide communication with the water inlet 114. With respect to the latter, the jack plug 137 has an internal passage 138 which extends axially through the jack plug and continues on through the body portion 135 to communicate with the open end of an inside tubing member 139 of a concentric tubing assembly, to be described. At the forward end, the passage 138 opens upwardly, as at 140 in FIG. 3. The arrangement is such that, when the jack plug 137 is fully inserted in the body member 113, the upwardly opening end 140 of the passage 138 is in direct communication with the inlet passage 114, providing for the flow of water from the inlet passage 114, into the passage 138 and thence into the inside member of the concentric tubing assembly.

To assure proper orientation of the jack plug with respect to the body member 113, the inner extremity of the body portion recess 125 is provided with opposed, angularly disposed flats 141. These cooperate with similar flat recesses 142, provided on the end extremities of the jack plug 137. Thus, the flats 141, 142 must be properly aligned and oriented, in order to permit full insertion of the jack plug 137 into the recess 125, as is evident in FIG. 4, for example.

In the forward end of the jack plug 137, there is provided a recess 143, which extends for a predetermined distance along the jack plug and is of a size and shape to receive the detent lug 131. The arrangement is such that, when the jack plug is forcibly inserted in the recess 125, the detent lug 131 is initially resiliently displaced downwardly, to clear the front edge 144 of the jack plug, after which the lug snaps upwardly into the recess 143. As is reflected in FIG. 3, the recess 143 is long enough to enable the jack plug to be inserted to full depth into the body portion 113. This provides for diversion of the water flow into the tubing 139, as reflected in FIG. 3. Where it is desired to retain the fixed and movable parts 110,111 of the diverter in assembled relation, but permit a direct flow of water downwardly through the discharge opening 127, the removable part 111 may be withdrawn partially, to the point where the detent lug 131 reaches the forward limit of its recess 143. This is easily determined by feel, inasmuch as further withdrawal of the jack plug 137 requires the detent lug 131 to be displaced. When the jack plug is in its partially retracted position, as shown in FIG. 7, the upwardly opening passage 138 is out of registry with the inlet passage 114 and thus closed off, and the jack plug is offset sufficiently to accommodate the direct downward flow of water through the fixed part 110 of the diverter. In either position of the jack plug 137, fully inserted or partially retracted, water flow along the outside of the jack plug is sealed off by means of an O-ring seal 145, retained in the forward end of the body member 113 by means of an adhesively secured retaining ring 146.

In the outer end of the removable member 111, the forwardly opening 136 is provided with a plurality concentric stops, for the reception and swivel connection of a double concentric tubing arrangement comprising the before mentioned inside tubing member 139 and an outside tubing member 147. The inside tubing member 139 is flared outwardly at its inner end extremity to form a flange 148, which abuts the bottom of the innermost recess portion 149. Surrounding the tube 139 and engageable with the forward surface of the flange 148 is a retaining ring 150. An O-ring 151 also surrounds the tube 139 and engages the front surface of the retaining ring 150. This entire assembly is held in place by a flanged retaining sleeve 152, which may be frictionally or adhesively retained in the recess portion 149.

The outer tubing member 147 is received in the outer recess portion 153 and is provided with an outwardly flaring flange 154 for abutment with the bottom surfaces 155 of the outer recess portion. A retaining ring 156, O-ring 157 and retaining sleeve 158 surround the end extremity of the tube member 147, with the sleeve 158 being frictionally or adhesively secured in the recess portion 153.

The described arrangement for connecting the tube members 139, 147 provides a highly simplified yet effective swivel connection for the individual, concentrically arranged tubes, which is ideally suited for the purposes intended. For further details of this arrangement, and for amplified description of the significant features and advantages thereof, reference should be made to our co-pending United States Patent Application Ser. No. 920,685, filed June 30, 1978, entitled "Fluid Line and Connection for Fluid-Driven Appliance", now U.S. Pat. No. 4,210,975, said application being incorporated herein by reference.

In a typical advantageous utilization of the diverter assembly of the invention, the dual concentric tubing 139, 147 is connected to a water-driven manual appliance, such as a power toothbrush, for example. In such utilization, when the diverter parts are fully assembled, as shown in FIG. 1, pressure water is directed from the faucet, through the passage 138 and into the inside flexible tubing member 139. The fluid is directed through the inside tubing to a remote appliance motor, which is driven thereby. The exhaust fluid, from the appliance motor, is directed through the annular passage defined between the outer flexible tubing member 147 and the inner member 139. This exhaust fluid flows in the return direction and is discharged into the recess 136. A discharge passage 159 extends downwardly through the lower body portion 160 of the removable part 111, communicating at its upper end with the recess 136 and discharging at its lower end 161 into a sink or other suitable receptacle.

Particularly in the case of a relatively low powered appliance, such as a power toothbrush, it is desirable to limit the pressure to which either the appliance or the inner tubing member 139 are subjected. To this end, the diverter appliance of the invention incorporates a simplified and inexpensive, yet highly effective form of pressure-limiting by-pass valve. For this purpose, the lower portion 160 of the removable part 111 is formed with by-pass passages 162, 163, communicating with the discharge passage 159. Normally, however, the by-pass passages 162, 163 are closed off by a cylindrical valve plunger 164, which seats against an annular valve surface 165. The valve plunger is retained in and guided by a cup-shaped cylindrical retainer 166, which is adhesively or otherwise secured in the lower body portion 160. The retainer 166 slidably receives the valve plunger 164, and also houses a compressible coil spring 167, which acts upwardly on the valve plunger 164.

Normally, the pressure of the spring 167 maintains the valve plunger 164 in a closed position, so that all fluid entering the passage 138 is directed through the inside tube member 139 and to the fluid-driven appliance. However, should the water pressure exceed a predetermined maximum level (for example, 40 psi may be desired in the case of a water-powered toothbrush) the valve plunger 164 will be depressed by the fluid pressure and a by-passing of a portion of the pressure fluid into the discharge passage 159 is caused. FIG. 8 of the drawing illustrates the by-pass valve plunger 164 in an opened position, accommodating the direct by-pass of a portion of the fluid to the outlet 159. As will be understood, if the valve 164 opens due to excessively high pressure of the incoming fluid, it will seek a position in which sufficient fluid is by-passed into the outlet 159 to reduce the pressure acting upon the tubing 139 to the desired level. Once the valve plunger 164 has been opened slightly, the fluid pressure will act upon a somewhat increased surface area, such that the by-pass valve will tend to remain open until the pressure is somewhat below the opening pressure. This prevents chattering of the valve if the pressure is varying slightly at the nominal level of by-pass operation.

In typical operation of the diverter unit, when the removable part 111 is detached from the fixed part 110, water is caused and permitted to flow through the inlet passage 114 and directly downwardly, through the open center of the resilient tongue 130 and out through the lower filter screen 132. If it is desired to use the water-powered appliance, the jack plug portion 137 of the removable part 111 is inserted into the recess 125. Typically, but not necessarily, this is done with the water turned off. As the jack plug 137 approaches the end of the recess, it becomes necessary to align the flat faces 142 of the jack plug with corresponding flat surfaces 141 in the recess, such that proper angular orientation of the jack plug is assured. In order to fully seat the jack plug, the detent lug 131 must be displaced downwardly to permit the end of the jack plug to pass, after which it snaps upwardly into the elongated recess 143. When the jack plug 137 is fully inserted, the end 140 of its fluid passage 138 is aligned with the inlet passage 114 to direct fluid into the removable part and thence into the inside tubing member 139.

When the appliance is in operation, the diverter unit freely swivels about a vertical axis, by reason of the swivel connection between the collar 112 and body portion 113 of the fixed part 110. In addition, the concentric double tubing may turn about its axis by reason of the swivel connection formed between the tubing and the removable diverter part 111. These freedoms of swiveling movement greatly facilitate the various and complex motions involved in the typical utilization of a hand held appliance such as a power toothbrush.

In the case of some appliances, such as a power toothbrush, for example, it may be desired at times to utilize the faucet conventionally, without completely detaching the appliance. To this end, the diverter assembly of the invention provides for the partial retraction of the jack plug 137, to the forward limit of the elongated detent slot 143, as shown in FIG. 7. In this position, the upwardly directed opening 140 into the jack plug passage 138 is sealed off, and water flow through the inlet passage 114 is required to flow downwardly for discharge through the lower screen 132. The water-powered appliance remains attached to the faucet, but is inoperative when the jack plug is in its attached, but retracted position. To render the appliance operative, all that is required is to push the removable part 111 into its fully seated position, which can be done with the water running in the fixed part, if desired.

The diverter assembly of the invention is uniquely designed to be capable of highly automated, mass production, so as to be suitable for use in connection with a low priced, water-powered home appliance, such as a toothbrush. To a large extent, the parts of the diverter assembly are of precision molded, plastic construction, capable of being produced in large quantities at extremely low price. Likewise, the various parts are arranged to be adhesively joined during assembly, such that the various parts may be designed and shaped for relatively inexpensive production.

It should be understood, of course, that the specific forms of the invention herein illustrated and described are intented to be representative only, as certain changes may be made therein without departing from the clear teachings of the disclosure. Accordingly, reference should be made to the following appended claims in determining the full scope of the invention.

We claim:

1. A diverter assembly for a water-powered appliance or the like, comprising
   (a) a generally fixed part for attachment to a faucet or the like,
   (b) a removable part attachable to said generally fixed part,
   (c) said generally fixed part having a downwardly extending fluid flow passageway therein for the downward passage of water from said faucet and a laterally opening fluid passage communicating with said downwardly extending fluid flow passageway,
   (d) said removable part including internal fluid flow passage-forming means communicating with said laterally opening fluid passage of the generally fixed part when said removable part is attached to said generally fixed part,
   (e) a yieldably movable element having an area exposed to the fluid pressure within said internal fluid flow passage-forming means,
   (f) flexible fluid conduit means connected to said removable part,
   (g) said yieldably movable element providing flow communication between said internal fluid flow passage-forming means and said flexible conduit means,
   (h) a fluid flow throttling element disposed in a spaced aligned relation to an open end of said yieldably movable element whereby an increase in fluid pressure within the internal fluid flow passage-forming means of the removable part above a predetermined value will cause movement of said yieldably movable element toward said throttling element, thereby regulating fluid pressure to said flexible fluid conduit means.

2. The diverter assembly according to claim 1, further characterized by
   (a) spring means acting between said yieldably movable element and said removable part to maintain said spaced relation between the throttling element and the yieldably movable hollow element,
   (b) said spring means being yieldable to the fluid pressure when said fluid pressure increased above said predetermined value whereby said movable element is displaced toward the throttling element.

3. The diverter assembly according to claim 1, further characterized by
   (a) said yieldably movable element comprising a tube-like element open at both ends and slidable received within the internal fluid flow passage-forming means,
   (b) said throttling element comprising a generally conically-shaped, plug-like member mounted within the internal fluid flow passage-forming means of the removable part and disposed in an aligned spaced relation to one of the open ends of the slidable tube-like element,
   (c) said tube-like element being displaceable toward said plug-like member upon an increase of the fluid pressure above said predetermined value whereby said one open end co-acts with the plug-like member to throttle fluid flow into the tube-like member.

4. The diverter assembly according to claim 3, further characterized by
   (a) said tube-like element including an outwardly extending disc portion, and
   (b) a spring acting between the removable part and the disc portion to maintain said spaced relation between the one open end of the tube-like element and the pluglike throttling member.

5. The diverter assembly of claim 4, futher characterized by
   (a) the other open end of said tube-like element being in fluid communication with said flexible fluid conduit means,
   (b) a space formed between the tube-like element and flexible fluid conduit means whereby a portion of the fluid flow may flow therebetween to exert fluid pressure on the tube-like element, said fluid pressure tending to urge the tube-like element toward the plug-like throttling member, and
   (c) said spring being yieldable to said fluid pressure when the pressure exceeds said predetermined value.

6. A diverter assembly for a water-powered appliance or the like, comprising
   (a) a body member attachable to a faucet or the like and including an internal fluid passage-forming means in fluid communication with said faucet,
   (b) flexible fluid conduit means in flow communication with said internal fluid passage-forming means,
   (c) a throttling member associated with said internal fluid passage-forming means,
   (d) said internal fluid-flow passage-forming means and said throttling member being co-operable upon an increase of fluid pressure within the passage-forming means above a predetermined value to restrict fluid flow into said flexible fluid conduit means thereby regulating fluid pressure therein.

7. The diverter assembly accordingly to claim 6 further characterized by
   (a) the internal fluid flow passage-forming means including an axially slidable tubelike element displaceable toward said throttling member by an increase of fluid pressure within the passage-forming means above said predetermined value.

8. The diverter assembly according to claim 6, further characterized by
   (a) said body comprising a fixed part attachable to said faucet or the like and a removable part attachable to said fixed part,
   (b) said fixed part having a vertical through passage for the direct downward flow of water from said faucet and a laterally opening passage communicating with said vertical through passage,
   (c) said removable part including an internal fluid passageway in flow communication with said laterally opening passage,
   (d) a valve seat interposed between said vertical through passage and said laterally opening passage,
   (e) a ball valve element disposed within said vertical through passage and being yieldably urged into a seating relation with said valve seat,
   (f) said removable part including a rod-like plunger extending from one end thereof and operable to displace said ball valve element yieldably away from said valve seat when the removable part is attached to said fixed part.

9. The diverter assembly according to claim 8, further characterized by
   (a) said vertical through passage including a valve associated with the lowermost end thereof whereby when the removable part is attached to said fixed part and the rodlike plunger thereof is positioned to displace said ball valve element away from said valve seat, said valve may be closed thereby acting to divert water flow in said vertical through passage into said laterally opening passage.

10. A diverter assembly for a water powered appliance or the like, comprising
   (a) a generally fixed part for attachment to a faucet or the like,
   (b) a removable part attachable to said generally fixed part,
   (c) said generally fixed part having a downwardly opening recess therein for the downward passage of water from a faucet, and a laterally opening recess communicating with said downwardly opening recess,
   (d) said generally fixed part having a collar for attachment to a faucet and a body portion connected to said collar for swiveling movement about a vertical axis coaxial with said collar,
   (e) said body portion having a vertical through passage for the direct downward flow of water from said faucet and a laterally opening passage communicating with said vertical through passage,
   (f) a removable part having a connecting member insertable in and removable from said laterally opening recess,
   (g) said connecting member having a lateral fluid passage therethrough adapted for communication with said faucet when said connecting member is received in said laterally opening passage.

* * * * *